United States Patent Office 3,578,674
Patented May 11, 1971

3,578,674
DERIVATIVES OF TETRAZOLYL ALKANOIC
ACIDS
Robert Thomas Buckler, Elkhart, Ind., assignor to
Miles Laboratories, Inc., Elkhart, Ind.
No Drawing. Filed Dec. 24, 1969, Ser. No. 888,069
Int. Cl. C07d 55/56
U.S. Cl. 260—308                                          5 Claims

ABSTRACT OF THE DISCLOSURE

A series of bifunctional amide derivatives of omega-5-aryl-2-tetrazolylalkanoic acids. These compounds are useful as anti-inflammatory agents.

SUMMARY OF THE INVENTION

This invention relates to a novel series of chemical compounds having useful pharmacological properties. The compounds are omega-5-aryl-2-tetrazolyl alkanoic acid amides in which the aryl moiety is substituted with at least one halogen atom and the amide moiety is bifunctional.

The compounds of this invention may be represented by the structural formula

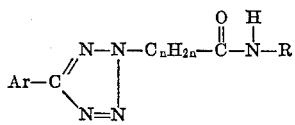

in which Ar is halogen substituted phenyl, $n$ is 1 to 4, and R is hydroxyl, hydroxyalkylene, preferably hydroxy lower alkylene, or formyl.

The novel compounds of this invention can be readily prepared by amination of a tetrazolyl acyl halide using the appropriately substituted tetrazolyl alkanoic acid as a precursor for the acyl halide, which is readily formed by halogenation thereof. Suitable halogenating agents include cyanuric chloride, phosphorus pentachloride, thionyl chloride and the like. The tetrazolyl acyl halide is then aminated using the appropriate bifunctional amine. Although the conditions of the reactions are not critical, it is preferred to conduct the halogenation in a suitable solvent such as chloroform. The amination reaction is also suitably conducted in a solvent for the bifunctional amine. Suitable solvents include tetrahydrofuran and the like. The halogenation reaction may be advantageously conducted under reflux while the amination reaction is satisfactorily run at room temperature or below. Other solvents for the halogenation reaction are benzene and toluene and other halogenating agents are thionyl bromide and phosphorus oxychloride.

The omega-5-aryl-2-tetrazolyl alkanoic acid starting materials may be prepared in accordance with the procedure described in U.S. Pat. No. 3,453,285 to Shin Hayao.

Preparation of these compounds may be illustrated in the following series of equations in which the various radicals are as indicated above.

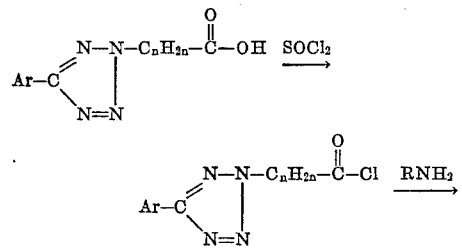

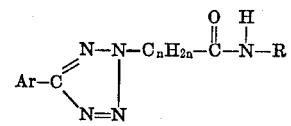

The N-hydromethyl amide derivatives are more conveniently prepared by refluxing the corresponding omega-5-aryl-tetrazolyl-alkanoic acid amide with aqueous formaldehyde.

The compounds of this invention are useful as anti-inflammatory agents.

Suitable medications may be prepared by combining one or more of the compounds of this invention as an active ingredient with fillers, carriers, extenders and excipients generally used in pharmaceutical formulations. Medications may be prepared in solid or liquid states as tablets, capsules, suspensions and similar dosage forms suitable for oral, intraperitoneal and other convenient means of administration. The active ingredients may be mixed with common diluents or tableting adjuncts such as cellulose powder, corn-starch, lactose, talc and the like according to accepted manufacturing practices. Unit dosages (in mg.) of active ingredients in the medication may be varied so that the amount used is adequate to provide the desired therapeutic result without untoward side effects and to permit satisfactory variation in dosages administered.

Anti-inflammatory activity was observed when medications including compounds of this invention as an active ingredient were administered orally to randomly selected groups of rats weighing between 260 and 400 grams. The active ingredients were evaluated according to a procedure in which pleurisy was induced by interpleural administration of Evans Blue and Carrageenen (0.075% Evans Blue–0.025% Carrageenen). The anti-inflammatory medication was given orally one hour before the interpleural administration of the solution. At six hours the animals were sacrificed and the pleural exudate was measured.

Groups of seven animals were used for each evaluation. In this assay the compound of Example 1 produced a percent decrease in pleural exudate of 25.7%, the compound of Example 2 a decrease of 32.3%, the compound of Example 3 a decrease of 9.9%, and the compound of Examples 4 a decrease of 13.6%.

DESCRIPTION OF THE PREFERRED EMBODIMENTS

EXAMPLE 1

3-[5′-(3″,4″-dichlorophenyl)-2′H-tetrazole]propiohydroxamic acid

A suspension of 3-[5′-(3″,4″-dichlorophenyl)-2′H-tetrazole]propionic acid (15.5 g., 0.054 mole) in 100 ml. of thionyl chloride was heated under reflux for 2 hours. The solution, which contained 3-[5′-(3″,4″-dichlorophenyl)-2′H-tetrazole]propionyl chloride, was concentrated in vacuo. I.R. $\nu_{max}$ 180(O cm.$^{-1}$ (acid halide carbonyl). A solution of sodium (5 g.) in methanol was added to a solution of hydroxylamine hydrochloride (15 g., 0.216 mole) in methanol. The mixture was cooled, filtered and concentrated in vacuo in a warm water bath. The concentrate was suspended in tetrahydrofuran and added to a benzene solution of the acid chloride concentrate. The mixture was stirred at room temperature for one hour and the solvent was removed in vacuo. The concentrate was suspended in ethyl acetate, washed with water and filtered. The filtrate was concentrated in vacuo to a solid. The resulting solid, 3-[5′-(3″,4″-dichlorophenyl)-2′H-tetrazole]propiohydroxamic acid, was recrystallized once from an aqueous methanol solution and three times from 2-propanol.

Yield: 4 g., M.P. 141.°–141.5°.

Analysis.—Calcd. for $C_{10}H_9Cl_2N_5O_2$ (percent): C, 39.76; H, 3.02; N, 23.17. Found (percent): C, 40.09; H, 3.28; N, 22.95.

EXAMPLE 2

N-hydroxymethyl-3-[5'-(3",4"-dichlorophenyl)-2(H-tetrazole]-propionamide

A solution of 10 g. (0.035 mole) of 3-[5'-(3",4"-dichlorophenyl)-2'H-tetrazole]propionamide was refluxed for three hours in 40% aqueous formaldehyde. The solution was then evaporated to dryness and the residue was dried at 110° C. for three days. Two recrystallizations from ethyl acetate gave 7 g. (63%) of N-hydroxymethyl-3-[5'-(3",4"-dichlorophenyl)-2'H-tetrazole]-propionamide, as fine white needles, M.P. 168° C.

Calculated for $C_{11}H_{11}N_5O_2Cl_2$ (percent): C, 41.78; H, 3.51. Found (percent): C, 42.02; H, 3.76.

EXAMPLE 3

N-formyl-3-[5'-(3",4"-dichlorophenyl)-2'H-tetrazole]-propionamide

A solution of 10 g. (0.031 mole) of 3-[5'-(3",4"-dichlorophenyl)-2'H-tetrazole]propionyl chloride in 50 ml. of dry tetrahydrofuran was cooled to 0° C. To this was added 2 g. of formamide in 3 ml. of pyridine. After standing for two hours at room temperature, the reaction was diluted with one liter of 1% aqueous sodium bicarbonate solution. The precipitate was filtered and recrystallized twice from benzene/heptane to give 1.0 g. (9%) of the imide, N-formyl-3-[5'(3",4"-dichlorophenyl)-2'H-tetrazole]propionamide, as fine white needles, M.P. 1680 C.

Calculated for $C_{11}H_9N_5O_2Cl_2$ (percent): C, 42.05; H, 2.89. Found (percent). C. 42.21; H, 3.13.

EXAMPLE 4

N-(2-hydroxyethyl)-3-[5'-(3",4"-dichlorophenyl)-2'H-tetrazole]propionamide

To a well stirred solution of 6 g. (0.019 mole) of 3-[5'-(3",4"-dichlorophenyl)-2'H-tetrazole]propionyl chloride in 50 ml. of dry tetrahydrofuran was added 4 g. (0.04 mole) of ethanolamine. After standing for one hour at room temperature, the solvent was removed under reduced pressure. Trituration with 500 ml. of water gave a white solid. Two recrystallizations from benzene gave 3.5 g. (46%) of N - (2 - hydroxyethyl)-3-[5'-(3",4"-dichlorophenyl-2'H-tetrazole]propionamide, as feathery white needles, M.P. 126° C.

Calculated for $C_{12}H_{13}N_5O_2Cl_2$ (percent): C, 43.66; H, 3.96. Found (percent): C, 44.03; H, 4.46.

What is claimed is:

1. A compound of the formula

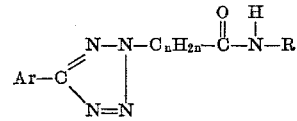

wherein Ar is halogen substituted phenyl, n is 1 to 4 and R is hydroxy, hydroxy-lower alkylene or formyl.

2. A compound according to claim 1 which is 3-[5'(3", 4"-dichlorophenyl)2'H-tetrazole]propiohydroxamic acid.

3. A compound according to claim 1 which is N-hydroxymethyl - 3 - [5'-(3",4"-dichlorophenyl)-2'H-tetrazole]-propionamide.

4. A compound according to claim 1 which is N-formyl - 3-[5'-(3",4"-dichlorophenyl)-2'H-tetrazole]propionamide 5. A compound according to claim 1 which is N-(2-hydroxyethyl) - 3 - [5'-(3",4"-dichlorophenyl)-2'H-tetrazole]propionamide.

References Cited

La Forge et al.: J. Org. Chem., vol. 21, pp. 767–771 (1956).

Walker: Formaldehyde (Reinhold Publishing Co., New York, 1953), p. 291.

ALTON D. ROLLINS, Assistant Examiner

U.S. Cl. X.R.

424—269